United States Patent
Seo et al.

(10) Patent No.: US 9,606,750 B2
(45) Date of Patent: Mar. 28, 2017

(54) METHOD OF STORING DATA IN DISTRIBUTED MANNER BASED ON TECHNIQUE OF PREDICTING DATA COMPRESSION RATIO, AND STORAGE DEVICE AND SYSTEM USING SAME

(71) Applicant: Research & Business Foundation SUNGKYUNKWAN UNIVERSITY, Suwon-si (KR)

(72) Inventors: Eui Seong Seo, Daejeon (KR); Bon Keun Seo, Gwangju (KR); Hyeon Hwa Kim, Suwon-si (KR)

(73) Assignee: Research and Business Foundation Sungkyunkwan University, Suwon-si (KR)

( * ) Notice: Subject to any disclaimer, the term of this patent is extended or adjusted under 35 U.S.C. 154(b) by 113 days.

(21) Appl. No.: 14/446,806

(22) Filed: Jul. 30, 2014

(65) Prior Publication Data

US 2015/0149739 A1    May 28, 2015

(30) Foreign Application Priority Data

Nov. 25, 2013 (KR) .................. 10-2013-0143580

(51) Int. Cl.
*G06F 3/06* (2006.01)

(52) U.S. Cl.
CPC ............ *G06F 3/0685* (2013.01); *G06F 3/064* (2013.01); *G06F 3/068* (2013.01); *G06F 3/0608* (2013.01); *G06F 3/0643* (2013.01)

(58) Field of Classification Search
CPC ...... G06F 3/0608; G06F 3/064; G06F 3/0643; G06F 3/06; G06F 3/0601; G06F 3/0628; G06F 3/0638; G06F 11/1456; G06F 11/2074; G06F 11/2071; G06F 11/1451; G06F 11/2082

See application file for complete search history.

(56) References Cited

U.S. PATENT DOCUMENTS

| | | | |
|---|---|---|---|
| 2002/0040413 A1* | 4/2002 | Okada ................. | G06F 3/0601 710/68 |
| 2003/0128140 A1* | 7/2003 | Xie ..................... | H03M 7/4006 341/107 |
| 2005/0192994 A1* | 9/2005 | Caldwell ........... | G06F 17/30286 |
| 2008/0025298 A1* | 1/2008 | Lev-Ran ............... | H04L 69/04 370/389 |
| 2008/0104591 A1* | 5/2008 | McCrory ............ | G06F 9/45558 718/1 |

(Continued)

*Primary Examiner* — Mano Padmanabhan
*Assistant Examiner* — Jean Edouard
(74) *Attorney, Agent, or Firm* — NSIP Law

(57) ABSTRACT

A method of storing data in a distributed manner based on data compression ratio prediction, and a mass storage device and system using the method are disclosed. The device includes a compression ratio predicting unit, a compressing unit, and a control unit. When an address and first unit sized data are received, the compression ratio predicting unit estimates the predicted compression ratio of the first unit sized data. The compressing unit generates compressed data. The control unit calculates the benefit of compression based on at least the estimated predicted compression ratio, stores the compressed data in a first storage area if the calculated benefit of compression is higher than a predetermined benefit threshold value, and stores the first unit sized data in the second storage area if the calculated benefit of compression is equal to or lower than the predetermined benefit threshold value.

18 Claims, 5 Drawing Sheets

(56) References Cited

U.S. PATENT DOCUMENTS

| | | | | |
|---|---|---|---|---|
| 2008/0147441 A1* | 6/2008 | Kil | G06F 19/345 | 705/2 |
| 2011/0145486 A1* | 6/2011 | Owa | G06F 12/0246 | 711/103 |
| 2012/0102005 A1* | 4/2012 | Kamei | G06F 3/0608 | 707/693 |
| 2012/0166752 A1* | 6/2012 | Taniyama | G06F 3/0686 | 711/170 |
| 2012/0290798 A1* | 11/2012 | Huang | G06F 3/0608 | 711/154 |
| 2013/0179659 A1* | 7/2013 | Seo | G06F 12/023 | 711/170 |
| 2013/0246721 A1* | 9/2013 | Fukutomi | G06F 3/0604 | 711/155 |
| 2013/0254441 A1* | 9/2013 | Kipnis | H03M 7/30 | 710/68 |
| 2014/0023135 A1* | 1/2014 | Fallon | H03M 7/30 | 375/240 |
| 2014/0132429 A1* | 5/2014 | Scoville | H03M 7/30 | 341/87 |
| 2014/0143517 A1* | 5/2014 | Jin | G06F 3/0608 | 711/171 |
| 2014/0164686 A1* | 6/2014 | Choi | G06F 3/0604 | 711/103 |
| 2014/0195498 A1* | 7/2014 | Asher | H03M 7/30 | 707/693 |
| 2014/0247167 A1* | 9/2014 | Kalevo | H03M 7/00 | 341/52 |
| 2014/0250257 A1* | 9/2014 | Khan | G11C 16/10 | 711/103 |
| 2014/0281168 A1* | 9/2014 | Koseki | G06F 11/108 | 711/103 |
| 2015/0089170 A1* | 3/2015 | Tung | G06F 12/023 | 711/160 |

* cited by examiner

METHOD OF STORING DATA IN DISTRIBUTED MANNER BASED ON TECHNIQUE OF PREDICTING DATA COMPRESSION RATIO, AND STORAGE DEVICE AND SYSTEM USING SAME

CROSS-REFERENCE TO RELATED APPLICATION(S)

This application claims the benefit under 35 USC 119(a) of Korean Patent Application No. 10-2013-0143580 filed on Nov. 25, 2013, in the Korean Intellectual Property Office, the entire disclosure of which is incorporated herein by reference for all purposes.

BACKGROUND OF THE INVENTION

1. Field of the Invention

The present invention relates generally to data storing technology and, more particularly, to selective data storing technology.

2. Description of the Related Art

With the development of technology, the costs required to store large amounts of data have gradually decreased, while, with the advent of the multimedia era, the amounts of data that users desire to store have increasingly grown. Accordingly, there is still needed for technology for capacity-efficiently storing data in a mass storage device.

In general, mass storage devices may be classified into rotating disk-based hard disk devices and nonvolatile memory device-based flash memory devices.

Although hard disk devices have high storage density per unit area, can be fabricated to have huge capacity to terabyte and can be manufactured at low cost, they have relatively low speed, and are vulnerable to impact because they are dependent on mechanical parts. Hard disk devices include various groups of commercial products ranging from a group of expensive products capable of ensuring high performance and high reliability to a group of inexpensive, low-performance products, and thus various level products are being supplied to the markets.

In contrast, although until now flash memory devices have rather low storage density, cannot be fabricated to have high capacity and are manufactured at high cost, they are robust to impact because they are based on semiconductor chips and printed circuit boards. Flash memory devices also include a group of expensive, high-performance single-level cell (SLC) products and a group of multi-level cell (MLC) products, and thus consumers can purchase various level products in terms of performance, capacity and lifespan.

Accordingly, some mass storage device products are configured in a fashion of attaching high-speed, high-performance, high-reliability flash memory to low-speed, low-performance hard disk storage, as a cache, thereby enhancing the performance of a hard disk device.

Furthermore, a plurality of mass storage devices can be combined and then driven as a super-high capacity storage system. In such cases, the individual mass storage devices may frequently have different speeds and different performances. Although a super-high capacity storage system had been at first constructed using the identical kind of mass storage devices, replacing old parts with new ones over time results in mixed products with different speeds, different performances and different capacities in the single system.

In the above-described storage environment in which mass storage devices having different speeds, different performances and different capacities are intentionally or naturally present together, a technology for, first, selecting a mass storage device where data will be stored from among the mass storage devices based on the characteristics of the data to be stored, and then storing the data, is required to achieve optimum storage performance.

For example, a method may be used that, based on the file extension, type or attribute, amount or access frequency of data to be stored, or a combination thereof, stores a system file, an executable file, a frequently accessed file, and a temporary file in a flash memory device and stores a large multimedia file in a low-speed hard disk device.

SUMMARY OF THE INVENTION

Accordingly, the present invention has been made keeping in mind the above problems occurring in the prior art, and an object of at least one embodiment of the present invention is to provide a method of storing data in a distributed manner based on a technique of predicting a data compression ratio, and a mass storage device and system using the method.

An object of at least one embodiment of the present invention is to provide a method of storing data in a distributed manner based on a technique of predicting the data compression ratio of unit data rather than analyzing the file extension or attribute of data, and a mass storage device and system using the method.

An object of at least one embodiment of the present invention is to provide a method of storing data in a distributed manner based on a technique of predicting the data compression ratio of unit data having low overhead, and a mass storage device and system using the method.

In accordance with an aspect of the present invention, there is provided a method of storing data in a distributed manner based on a technique of predicting a data compression ratio, the method including, by a mass storage device having logically or physically defined first and second storage areas, receiving an address and first unit sized data, together with a write command, from a host device; estimating the predicted compression ratio of the first unit sized data based on a Shannon byte entropy; calculating the benefit of compression based on the at least estimated predicted compression ratio; comparing the calculated benefit of compression with a predetermined benefit threshold value, and compressing the first unit sized data and then storing the compressed data in the first storage area if the calculated benefit of compression is higher than the predetermined benefit threshold value; and comparing the calculated benefit of compression with a predetermined benefit threshold value, and storing the first unit sized data in the second storage area if the calculated benefit of compression is equal to or lower than the predetermined benefit threshold value.

The predicted compression ratio may be estimated using the following predicted compression ratio estimation formula:

$$C(X) = H(X)^c$$

where $$H(X) = -\sum_i P(x_i)\log_b P(x_i)$$
$$= -\sum_i \frac{n_i}{N}\log_b \frac{n_i}{N}$$
$$= \log_b N - \frac{1}{N}\sum_i n_i \log_b n_i$$

where C(X) is a predicted compression ratio of sample data X including data symbols $x_i$, $n_i$ is an appearance frequency of each of the data symbols $x_i$ in the sample data X, N is an overall appearance frequency of the data symbols $x_i$ in the sample data X, H(X) is a Shannon byte entropy of the sample data X, $P(x_i)$ is a probability mass function of the data symbol $x_i$, and c is a predicted compression index that is empirically given based on a compression method.

The predicted compression ratio may be estimated using the following predicted compression ratio estimation formula:

$$C(X) = 2^{H(X)^2} - 1$$

where C(X) is the predicted compression ratio of sample data X, and H(X) is the Shannon byte entropy of the sample data X.

The predicted compression ratio may be estimated by referring to a look-up table that is constructed by mapping each Shannon entropy value to a predicted compression ratio value based on an actual compression ratio obtained using at least one compression method.

The benefit of compression may be calculated based on at least one of the remaining storage capacity of the first storage area in which compressed data will be stored or the remaining storage capacity of the second storage area in which uncompressed data will be stored, data fragmentation degree, compression-related overhead, the issuer of a write command and the size of a file, and the predicted compression ratio.

Compressing the first unit sized data and then storing the compressed data in the first storage area may include converting the compressed data into at least one piece of second unit sized data having a second unit size for storage in the first storage area and then storing the second unit sized data in the first storage area; and storing the first unit sized data in the second storage area may include converting the first unit sized data into at least one piece of second unit sized data and then storing the second unit sized data in the second storage area.

The method may further include mapping actual data locations in the first and second storage areas where the second unit sized data have been stored with an address of the first unit sized data and then recording the actual data locations and the address together in a data location mapping unit.

The method may further include receiving the address of first unit sized data desired to be accessed, together with a read command, from the host device; obtaining an actual data location corresponding to the address attached to the read command by referring to the data location mapping unit; if an actual data location of the first unit sized data desired to be read corresponds to the first storage area, fetching compressed second unit sized data from an actual data location in the first storage area and generating the decompressed data by decompressing the compressed second unit sized data; if the actual data location of the first unit sized data desired to be read corresponds to the second storage area, fetching uncompressed second unit sized data from an actual data location in the second storage area; and generating the first unit sized data from the decompressed data or the uncompressed second unit sized data, and transmitting the generated first unit sized data to the host device.

In accordance with another aspect of the present invention, there is provided a device for storing data in a distributed manner based on a technique of predicting a data compression ratio, the mass storage device having logically or physically defined first and second storage areas, the device including a compression ratio predicting unit configured to, when an address and first unit sized data, together with a write command, are received from a host device, estimate the predicted compression ratio of the first unit sized data based on a Shannon byte entropy; a compressing unit configured to generate compressed data by compressing the first unit sized data; and a control unit configured to calculate the benefit of compression based on at least the estimated predicted compression ratio, to compare the calculated benefit of compression with a predetermined benefit threshold value, to store the data compressed by the compressing unit in the first storage area if the calculated benefit of compression is higher than the predetermined benefit threshold value, and to store the first unit sized data in the second storage area if the calculated benefit of compression is equal to or lower than the predetermined benefit threshold value.

The predicted compression ratio may be estimated using the following predicted compression ratio estimation formula:

$$C(X) = H(X)^c$$

where $$H(X) = -\sum_i P(x_i)\log_b P(x_i)$$
$$= -\sum_i \frac{n_i}{N}\log_b \frac{n_i}{N}$$
$$= \log_b N - \frac{1}{N}\sum_i n_i \log_b n_i$$

where C(X) is a predicted compression ratio of sample data X including data symbols $x_i$, $n_i$ is an appearance frequency of each of the data symbols $x_i$ in the sample data X, N is an overall appearance frequency of the data symbols $x_i$ in the sample data X, H(X) is a Shannon byte entropy of the sample data X, $P(x_i)$ is a probability mass function of the data symbol $x_i$, and c is a predicted compression index that is empirically given based on a compression method.

The predicted compression ratio may be estimated using the following predicted compression ratio estimation formula:

$$C(X) = 2^{H(X)^2} - 1$$

where C(X) is a predicted compression ratio of sample data X, and H(X) is a Shannon byte entropy of the sample data X.

The predicted compression ratio may be estimated by referring to a look-up table that is constructed by mapping each Shannon entropy value to a predicted compression ratio value based on an actual compression ratio obtained using at least one compression method.

The benefit of compression may be calculated based on at least one of the remaining storage capacity of the first storage area in which compressed data will be stored or the remaining storage capacity of the second storage area in which uncompressed data will be stored, data fragmentation degree, compression-related overhead, the issuer of a write command and the size of a file, and the predicted compression ratio.

The control unit may be further configured to calculate the benefit of compression based on at least the estimated predicted compression ratio, and compare the calculated benefit of compression with a predetermined benefit threshold value; to, if the calculated benefit of compression is higher than the predetermined benefit threshold value, convert compressed data into at least one piece of second unit sized data having a second unit size for storage in the first storage area using the compressing unit, and store the second unit sized data in the first storage area; and to, if the calculated benefit of compression is equal to or lower than the predetermined benefit threshold value, convert the first unit sized data into at least one piece of second unit sized data, and store the second unit sized data in the second storage area.

The device may further include a data location mapping unit configured to map the actual data locations in the first and second storage areas where the second unit sized data have been stored, to the address of the first unit sized data, and to then record the actual data locations and the address together.

The device may further include a decompressing unit configured to generate decompressed data by decompressing the compressed second unit sized data; and the control unit may be further configured to, when an address of first unit sized data desired to be accessed, together with a read command, is received from the host device, obtain an actual data location corresponding to the address attached to the read command by referring to the data location mapping unit, fetch compressed second unit sized data from the actual data location in the first storage area and also generate the decompressed data by decompressing the compressed second unit sized data if the actual data location of the first unit sized data desired to be read corresponds to the first storage area, fetch uncompressed second unit sized data from the actual data location in the second storage area if the actual data location of the first unit sized data desired to be read corresponds to the second storage area, and generate the first unit sized data from the decompressed data or the uncompressed second unit sized data and also transmit the generated first unit sized data to the host device.

In accordance with still another aspect of the present invention, there is provided a system for storing data in a distributed manner based on a technique of predicting a data compression ratio, the system having logically or physically defined first and second storage devices to function as independent storage devices, the device including a compression ratio predicting unit configured to, when an address and first unit sized data, together with a write command, are received from a host device, estimate a predicted compression ratio of the first unit sized data based on a Shannon byte entropy; a compressing unit configured to generate compressed data by compressing the first unit sized data; and a control unit configured to calculate benefit of compression based on at least the estimated predicted compression ratio, to compare the calculated benefit of compression with a predetermined benefit threshold value, to store the data compressed by the compressing unit in the first storage area if the calculated benefit of compression is higher than the predetermined benefit threshold value, and to store the first unit sized data in the second storage area if the calculated benefit of compression is equal to or lower than the predetermined benefit threshold value.

The control unit may be further configured to calculate the benefit of compression based on at least the estimated predicted compression ratio, and compare the calculated benefit of compression with a predetermined benefit threshold value; to, if the calculated benefit of compression is higher than the predetermined benefit threshold value, convert compressed data into at least one piece of second unit sized data having a second unit size for storage in the first storage area using the compressing unit, and store the second unit sized data in the first storage area; and to, if the calculated benefit of compression is equal to or lower than the predetermined benefit threshold value, convert the first unit sized data into at least one piece of second unit sized data, and store the second unit sized data in the second storage area.

The system may further include a data location mapping unit configured to map the actual data locations in the first and second storage areas where the second unit sized data have been stored, to the address of the first unit sized data, and to then record the actual data locations and the address together.

The system may further include a decompressing unit configured to generate decompressed data by decompressing the compressed second unit sized data; and the control unit is further configured to, when an address of first unit sized data desired to be accessed, together with a read command, is received from the host device, obtain an actual data location corresponding to the address attached to the read command by referring to the data location mapping unit, fetch compressed second unit sized data from the actual data location in the first storage area and also generate the decompressed data by decompressing the compressed second unit sized data if the actual data location of the first unit sized data desired to be read corresponds to the first storage area, fetch uncompressed second unit sized data from an actual data location in the second storage area if the actual data location of the first unit sized data desired to be read corresponds to the second storage area, and generate the first unit sized data from the decompressed data or the uncompressed second unit sized data and also transmit the generated first unit sized data to the host device.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
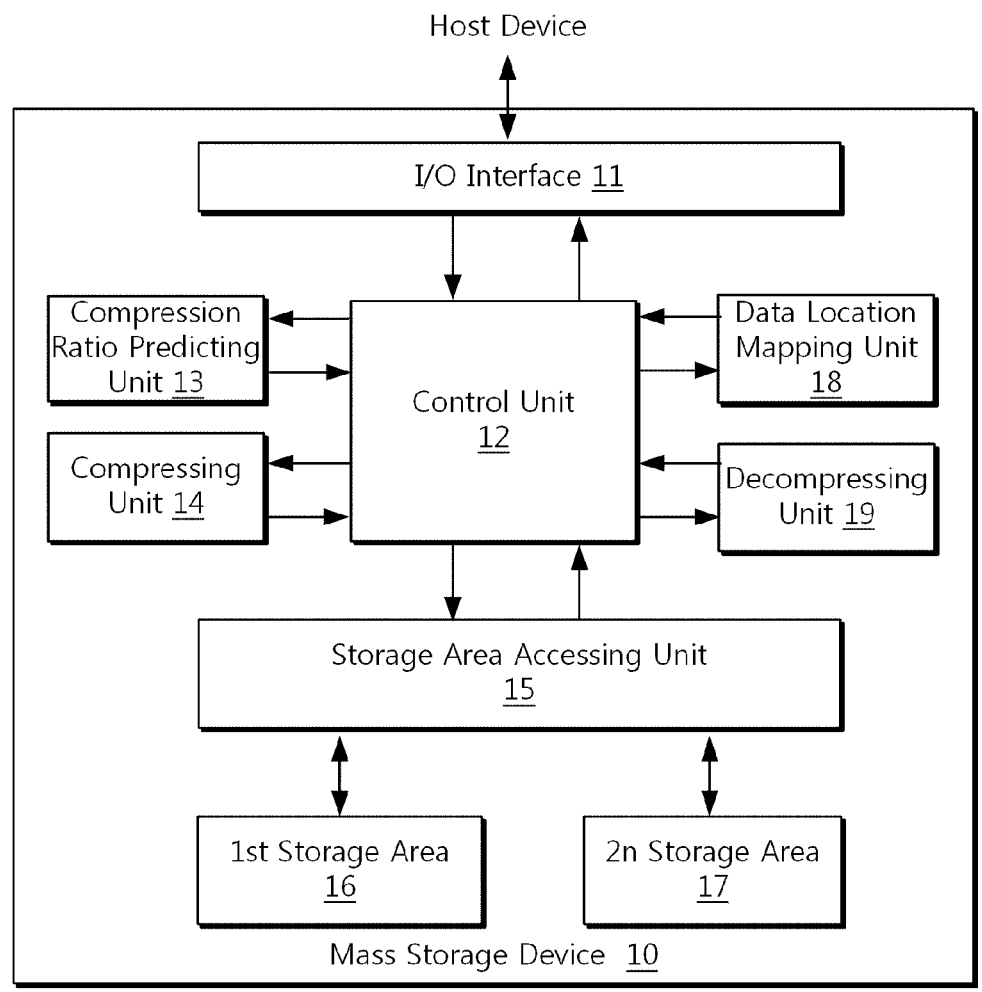
FIG. 1 is a conceptual diagram illustrating a mass storage device for storing data in a distributed manner based on a technique of predicting a data compression ratio according to an embodiment of the present invention.

Specific structural and functional descriptions of embodiments of the present invention disclosed herein are given merely for the purpose of illustrating example embodiments of the present invention. Embodiments of the present invention may be practiced in various forms, and should not be construed as being limited to embodiments described herein.

Preferred embodiments of the present invention are described in detail below with reference to the accompanying diagrams. The same reference numerals are assigned to the same components throughout the drawings, and redundant descriptions of the same components are omitted.

FIG. 1 is a conceptual diagram illustrating a mass storage device for storing data in a distributed manner based on a technique of predicting a data compression ratio according to an embodiment of the present invention.

Referring to FIG. 1, the mass storage device 10 for storing data in a distributed manner based on a technique of predicting a data compression ratio may include an input and output interface 11, a control unit 12, a compression ratio predicting unit 13, a compressing unit 14, a storage area accessing unit 15, a plurality of storage areas 16 and 17, a data location mapping unit 18, and a decompressing unit 19.

In this case, by way of example, the first storage area 16 of the plurality of storage areas 16 and 17 providing higher performance at higher storage cost but having smaller capacity, compared to the second storage area 17, may be set as a storage area for storing compressed data. In contrast, the second storage area 17 providing relatively lower performance at lower storage cost, but having larger capacity, may be set as a storage area for storing uncompressed data. Meanwhile, the plurality of storage areas 16 and 17 may be configured to simply have different roles, rather than different performances.

For example, the first storage area 16 may be provided with a single-level cell (SLC)-type nonvolatile storage area, while the second storage area 17 may be provided with a multi-level cell (MLC)-type nonvolatile storage area.

Furthermore, the first and second storage areas 16 and 17 may be logically or physically defined. For example, the first and second storage areas 16 and 17 may be respective storage areas logically defined in a single physical storage device, portions of a large storage area logically defined using multiple physical storage devices, or each of multiple physical storage devices.

More specifically, the mass storage device 10 receives a write command or a read command of data from a host device using the mass storage device 10 as an auxiliary storage device, via the input and output interface 11. A write command is received by the input and output interface 11, together with data and an address. The data has a first unit size, with which the file system of an operating system (OS) reads and writes a file. The first unit size may be, for example, a size of a unit block or a unit cluster, for specific example, a size of 4096 bytes or 8192 bytes.

The input and output interface 11 electrically and logically connects the host device with the control unit 12, transfers a first unit sized data and an address, received along with the write command, to the control unit 12, and transmits a first unit sized data, transferred from the control unit 12, to the host device in the case of a read command.

In the case of a write command, the control unit 12 transfers the first unit sized data, transferred from the input and output interface 11, to the compression ratio predicting unit 13, so that the compression ratio predicting unit 13 estimates a predicted compression ratio based on a Shannon entropy value. Thereafter, the control unit 12 calculates a benefit of compression of the first unit sized data based on the predicted compression ratio transferred from the compression ratio predicting unit 13.

The compression ratio predicting unit 13 may estimate the predicted compression ratio of the first unit sized data using a predicted compression ratio estimation formula, such as below described Equation 1 or 2, which is simplified based on a trend curve empirically derived from Shannon entropies (preferably, byte entropies in the case where b=2) calculated from sample data and actual compression ratios obtained by compressing the sample data using various compression methods.

$$C(X) = H(X)^c \qquad (1)$$

where $$H(X) = -\sum_i P(x_i)\log_b P(x_i)$$
$$= -\sum_i \frac{n_i}{N}\log_b \frac{n_i}{N}$$
$$= \log_b N - \frac{1}{N}\sum_i n_i \log_b n_i$$

In Equation 1, C(X) is a predicted compression ratio of sample data X including a data symbol $x_i$, $n_i$ is the frequency of appearance of each data symbol $x_i$ in the sample data X, N is the overall frequency of appearance of all of the data symbols in the sample data X, H(X) is the Shannon byte entropy of the sample data X, $P(x_i)$ is the probability mass function of the data symbol $x_i$, and c is a predicted compression index that is empirically given based on a compression method (e.g., c=4 in the case of a gzip method.

$$C(X) = 2^{H(X)^2} - 1 \qquad (2)$$

In Equation 2, C(X) is the predicted compression ratio of sample data X, and H(X) is the Shannon byte entropy of the sample data X.

The predicted compression ratio estimation formula of Equation 1 or 2 is an example formula, and may be empirically derived from the relationship between Shannon entropy values and actual compression ratios based on various compression methods.

Figure 2:
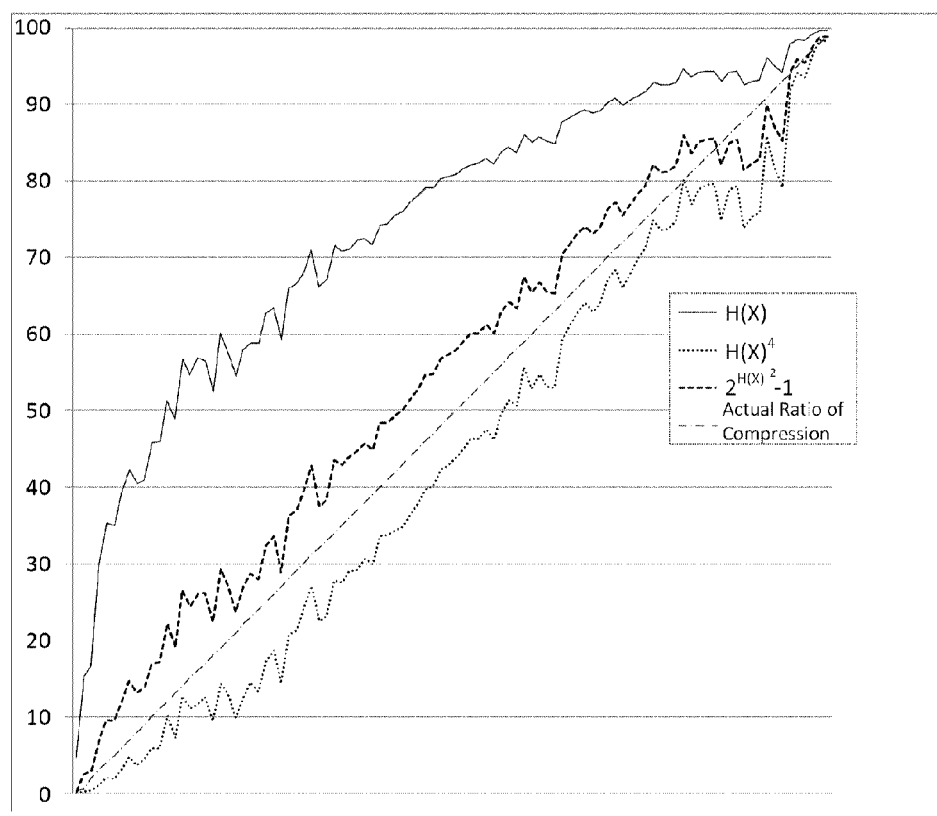
FIG. 2 is a graph plotting actual compression ratios that were obtained by applying Shannon entropy values, predicted data compression ratios and specific compression algorithms to predetermined sample data in a mass storage device for storing data in a distributed manner based on a technique of predicting a compression ratio according to an embodiment of the present invention.

In order to illustrate the accuracy of prediction of the predicted compression ratio estimation formula, FIG. 2 may be referred to. FIG. 2 has graphs comparing Shannon entropy values, predicted data compression ratios and actual compression ratios that were obtained by applying specific compression algorithms, with respect to predetermined sample data, in a mass storage device for storing data in a distributed manner based on a technique of predicting a compression ratio according to an embodiment of the present invention.

Referring to FIG. 2, in order to derive a predicted compression ratio estimation formula that estimates the compression ratio of data, the Shannon entropy value H(X) of sample data X, the actual compression ratio obtained by actually compressing the sample data X, and the predicted compression ratio C(X) based on Equation 1 or 2 are compared with one another by way of example.

In FIG. 2, H(X) is indicated by a solid line, while the result obtained using the predicted compression ratio estimation formula of Equation 1 is indicated by a dotted line and the result obtained using the predicted compression ratio estimation formula of Equation 2 is indicated by a broken line, the actual compression ratio being indicated by a ruled line.

Referring back to FIG. 1, in an embodiment, the compression ratio predicting unit 13 may use a method of constructing a look-up table by mapping every Shannon entropy value to a predicted compression ratio value based on an actual compression ratio obtained using at least one compression method, and estimating a predicted compression ratio by referring to the look-up table, instead of the method using a predicted compression ratio estimation formula.

Then, after the predicted compression ratio, predicted by the compression ratio predicting unit 13 with calculating the predicted compression ratio estimation formula or with referring to the compression ratio table, has been returned to the control unit 12, the control unit 12 determines whether to compress based on at least a predicted compression ratio.

In an embodiment, in order to determine whether to compress or not, the control unit 12 calculates the benefit of compression based on at least a predicted compression ratio and then compares the benefit of compression with a predetermined benefit threshold value, thereby determining whether to compress. For example, the benefit of compression may be calculated based on how many storing units can be actually reserved by storing compressed data in the first storage device 16 according to the predicted compression ratio, and then whether to compress may be determined based on the benefit of compression.

Furthermore, in an embodiment, the control unit 12 may calculate the benefit of compression based on not only the predicted compression ratio but also the remaining storage capacity of the first storage area 16 in which compressed data will be stored or the remaining storage capacity of the second storage area 17 in which uncompressed data will be stored. For example, even though the predicted compression ratio is actually low, the benefit of compression may be calculated high when the remaining storage capacity of the first storage area 16 is large enough while the remaining storage capacity of the second storage area 17 is rather small. A configuration may be set such that if the remaining storage capacity of the first storage area 16 is excessively small, the benefit of compression is calculated high enough only when the predicted compression ratio is significantly high.

Furthermore, the benefit of compression may be calculated based on data fragmentation degree. In general, if data stored in a storage device is excessively fragmented, the overall performance of the storage device may be reduced. If a specific file is stored, due to internal compression ratio differences, in such a way that some part is compressed and stored in the first storage area 16, some other part is stored without compression in the second storage area 17, and still another part is stored in still another storage area (not illustrated), this may be undesirable.

In an embodiment, the benefit of compression may be calculated based on the influence of compression-related overhead, the source of a write command, the size of a file, and the access frequency of a block, etc.

For example, if a write command is based on a commit transaction or a checkpoint transaction of a cache, first unit sized data may be likely accessed to from the OS again, and thus it is preferable to store the first unit sized data in the first storage area 16 having better performance.

In contrast, if first unit sized data related to a write command is based on main memory and the size of the file thereof is rather large, it is preferable to store the first unit sized data in the second storage area 17 having sufficient storage capacity.

Meanwhile, if overhead attributable to compression and decompression is excessive, it may be possible to compensate for time delay attributable to the overhead by storing compressed data in the first storage area 16 having better performance.

If the access frequency of a specific block is high, the benefit of compression may be calculated also high, and then data may be stored in the first storage area 16. For this purpose, a means for recording and referring the access frequencies of blocks to may be further required. The means for recording and referring the access frequencies of blocks to may be, for example, a well-known means for recording in flags of a metadata table whether each specific block has been accessed for a predetermined time interval.

Accordingly, the benefit of compression of the first unit sized data, having a high compression ratio but a low access frequency or no access for a predetermined time interval, is calculated low, and may be then stored in the second storage area 17.

The formula of the benefit of compression may be configured so as to reflect the above-described various empirical considerations.

If the calculated benefit of compression is higher than a predetermined benefit threshold value, the control unit 12 determines to compress and store the first unit sized data, and transfers the first unit sized data to the compressing unit 14.

The compressing unit 14 compresses the first unit sized data transferred from the control unit 12 using a predetermined compression method, and returns the compressed data to the control unit 12.

In contrast, if the calculated benefit of compression is not higher than the predetermined benefit threshold value, the control unit 12 determines to store the first unit sized data without compressing it.

In an embodiment, the compression ratio predicting unit 13 may be configured to perform the operations of calculating the benefit of compression from a predicted compression ratio and comparing the calculated benefit of compression with a benefit threshold value.

In an embodiment, the benefit threshold value may be determined variably depending on at least one of the remaining storage capacity of the first storage area 16 in which compressed data will be stored or the remaining storage capacity of the second storage area 17 in which uncompressed data will be stored, data fragmentation degree, compression-related overhead, the source of a write command, and the size of a file.

Now, the control unit 12 converts the data compressed by the compressing unit 14 or the uncompressed first unit sized data into at least one piece of second unit sized data having a second unit size, that is, a predetermined block size used for storing data in a physical storage area, and transmits the resulting second unit sized data to the storage area accessing unit 15.

Although the first unit size may be the same as the second unit size, they may different from each other in an embodiment, and it may be preferred that the second unit size is smaller than the first unit size. For example, the OS of the host device can perform reading and writing operations based on first unit size corresponding to a 4096-byte cluster, while the mass storage device 10 can internally perform reading and writing operations based on second unit size corresponding to a 512-byte sector. In this case, the mass storage device 10 may externally transmit or receive data based on a size of 4096 bytes, and may internally record and read data based on a size of 512 bytes.

In this case, for example, when specific first unit sized data having a 5100-byte size is received along with a write command, the first unit sized data is converted into ten pieces of second unit sized data if it is determined that the first unit sized data will not be compressed, and compressed data may be converted into four pieces of second unit sized data if it is determined that the first unit sized data will be compressed and also the compressing unit 14 generates, for example, 2010-byte sized compressed data by compressing the first unit sized data. This case may save a 3-kB storage space, corresponding to six 512-byte sectors, through compression, compared to the case of no compression.

The storage area accessing unit 15 stores a second unit sized data being converted from the compressed data based on the second unit size in the first storage area 16, and another second unit sized data being converted from the uncompressed first unit sized data in the second storage area, and notifies the control unit 12 of the actual data locations at which the second unit sized data have been stored.

The control unit 12 may map the actual data locations to the first or second storage area 16 or 17, where the second unit sized data have been stored, to the address of the first unit sized data attached within the write command, and may record the actual data locations and the address together in the data location mapping unit 18. The address is a data location at which the first unit sized data is known to have been stored by the file system of the OS. Since the size of the data to be stored has been reduced through compression, a data location acknowledged to the OS may be different from a data location in the storage area 16 or 17 where the data has been actually stored.

Meanwhile, when a read command, together with the address of a block or a cluster that the read command desires to access, is received by the input and output interface 11, the control unit 12 acquires an actual data location corresponding to the address, attached within the read command received via the input and output interface 11, by referring to the data location mapping unit 18.

If the actual data location of the first unit sized data of the address desired to be read at least partially corresponds to the first storage area 16, the control unit 12 fetches compressed second unit sized data from the actual data location in the first storage area 16 via the storage area accessing unit 15, and transfers the compressed second unit sized data to the decompressing unit 19.

The decompressing unit 19 decompresses the compressed second unit sized data using a decompression method corresponding to the compression method of the compressing unit 14, and transfers the generated decompressed data to the control unit 12.

Furthermore, if the actual data location of the first unit sized data of the address desired to be read at least partially corresponds to the second storage area 17, the control unit 12 fetches the uncompressed second unit sized data from the actual data location in the second storage area 17 via the storage area accessing unit 15.

The control unit 12 generates the first unit sized data from the decompressed or uncompressed second unit sized data, and transmits the generated first unit sized data to the host device.

Unlike conventional methods of storing whole data based on analysis of an extension or an attribute for each file or storing whole data compressively or non-compressively based on a compression ratio obtained by actually compressing a part of the data, the data distribution method of the present invention obtains the Shannon entropy of data for each block or cluster and then performs compressive or non-compressive storage.

That is, the data distribution method of the present invention may partially compress and then store easily compressible blocks of each file, and may partially store incompressible blocks without compressing them. Accordingly, in the case of a file having a low compression ratio, the file may be partially compressible here and there, and thus storage space can be further saved even without compressing the whole file.

The computation of the Shannon entropy of data having about the size of a unit block or cluster and the related computation of predicted compression ratio and the benefit of compression and the related computation of compression rarely cause overhead because they require small amounts of computation, whereas storage space efficiency can be considerably increased by compression.

Furthermore, since such compressive storing can be performed hardware based in the mass storage device, it does not require the support of the OS, and thus compatibility keeps good.

Figure 3:
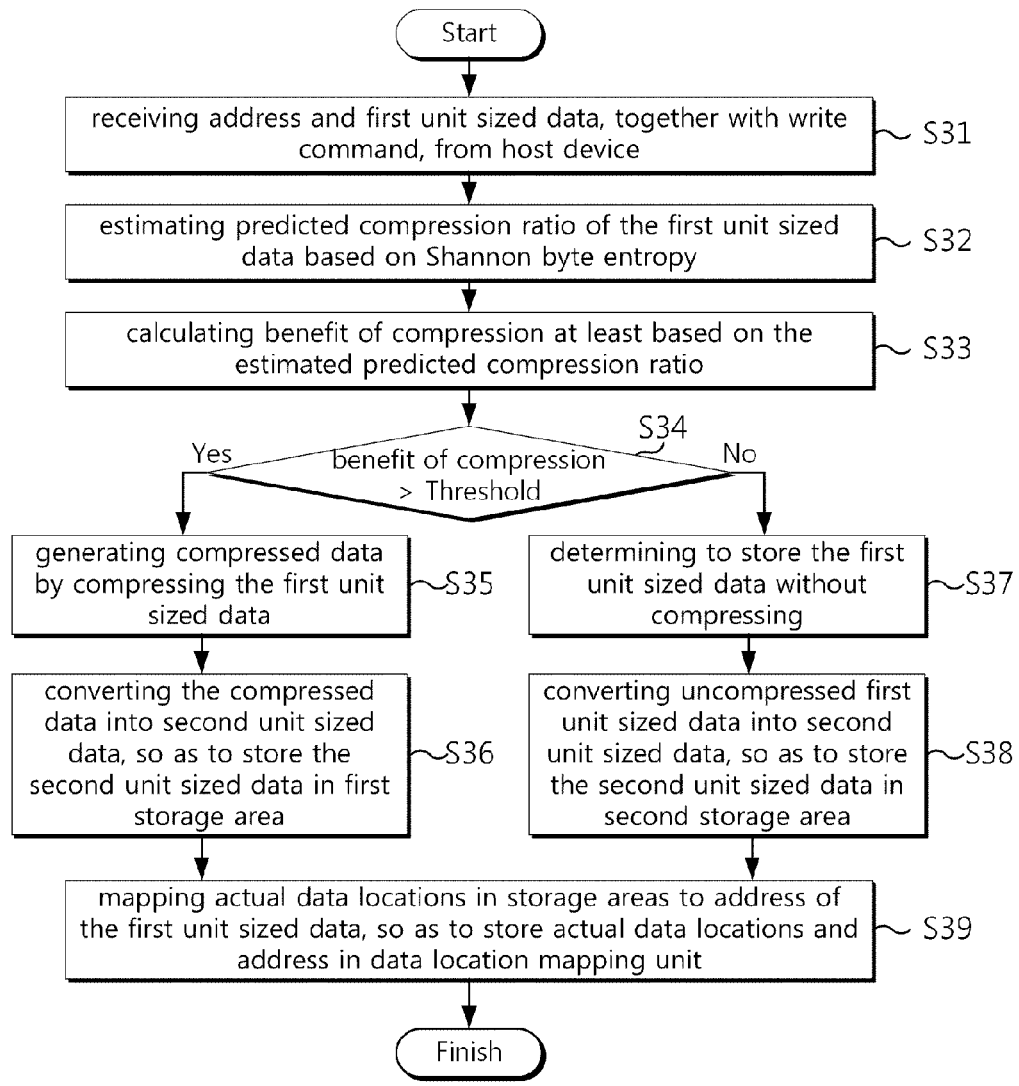
FIG. 3 is a flowchart illustrating a method of storing data in a distributed manner based on a technique of predicting a data compression ratio according to an embodiment of the present invention.

FIG. 3 is a flowchart illustrating a method of storing data in a distributed manner based on a technique of predicting a data compression ratio according to an embodiment of the present invention.

In the method of storing data in a distributed manner based on a technique of predicting a data compression ratio according to this embodiment of the present invention, the mass storage device 10 having at least two storage areas 16 and 17 receives an address and a first unit sized data, together with a write command, from the host device step at step S31.

At step S32, the mass storage device 10 estimates the predicted compression ratio of the first unit sized data based on Shannon byte entropy.

In an embodiment, the predicted compression ratio may be estimated using a predicted compression ratio estimation formula, such as Equation 1.

In an embodiment, the predicted compression ratio may be estimated by referring to a look-up table that is constructed by mapping values of Shannon entropy to values of the predicted compression ratio based on actual compression ratio obtained using at least one compression method.

At step S33, the mass storage device 10 calculates the benefit of compression at least based on the estimated predicted compression ratio.

In an embodiment, the benefit of compression may be calculated based on at least one of the remaining storage capacity of the first storage area 16 which is supposed to store compressed data or the remaining storage capacity of the second storage area 17 which is supposed to store uncompressed data, data fragmentation degree, compression-related overhead, the issuer of a write command and the size of a file, and the predicted compression ratio.

At step S34, the benefit of compression calculated by the mass storage device 10 is compared with a predetermined benefit threshold value.

In an embodiment, the benefit threshold value may be determined variably depending on at least one of the remaining storage capacity of the first storage area 16 which is supposed to store compressed data or the remaining storage capacity of the second storage area 17 which is supposed to store uncompressed data, data fragmentation degree, compression-related overhead, the issuer of a write command, and the size of a file.

At step S34, the process proceeds to step S35 if the calculated benefit of compression is higher than the predetermined benefit threshold value, and proceeds to step S37 if not.

At step S35, the mass storage device 10 determines to compress and store the first unit sized data, and generates compressed data by compressing the first unit sized data using a predetermined compression method.

At step S36, the mass storage device 10 converts the compressed data into at least one piece of second unit sized data having a second unit size, that is, a predetermined unit size for storing data in the first storage area 16, and stores the resulting second unit sized data in the first storage area 16.

At step S37, the mass storage device 10 determines to store the first unit sized data without compressing it.

At step S38, the mass storage device 10 converts the uncompressed first unit sized data into at least one piece of second unit sized data, and stores the second unit sized data in the second storage area 17.

According to some embodiments the first unit size may be the same as the second unit size. In other embodiments, the first and second unit sizes may be different from each other, and further it may be preferred that the second unit size be smaller than the first unit size.

At step S39, the mass storage device 10 may map the actual data locations in the first storage area 16 or the second storage area 17, where the second unit sized data have been actually stored, to the address of the first unit sized data and then store the actual data locations and the address in the data location mapping unit 18.

Figure 4:
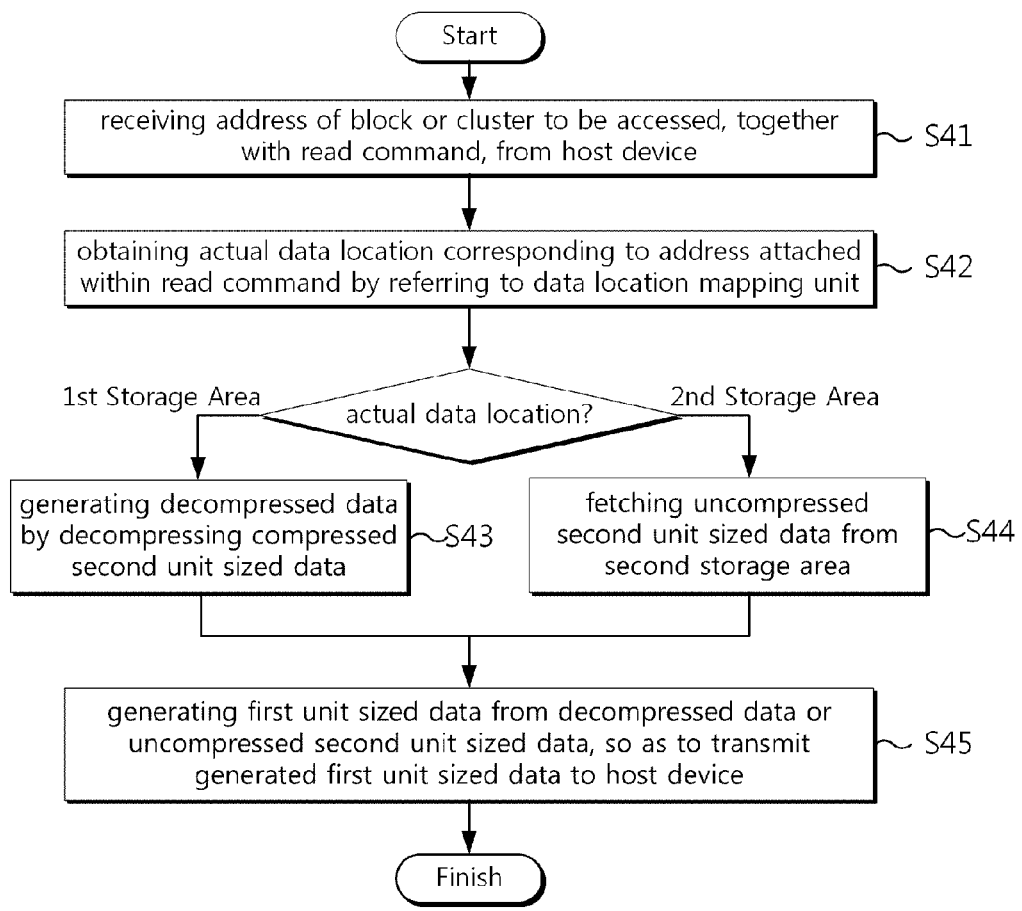
FIG. 4 is a flowchart illustrating a method of reading data that is stored using a method of storing data in a distributed manner based on a technique of predicting a data compression ratio according to an embodiment of the present invention.

Meanwhile, operations, to be performed when a read command is issued, are described with reference to FIG. 4. FIG. 4 is a flowchart illustrating a method of reading data that is stored using a method of storing data in a distributed manner based on a technique of predicting a data compression ratio according to an embodiment of the present invention.

In FIG. 4, the mass storage device 10 receives the address of a block or a cluster to be accessed, together with a read command, from the host device at step S41.

At step S42, the mass storage device 10 obtains an actual data location corresponding to the address attached within the read command by referring to the data location mapping unit 18, in which the actual data locations of the second unit sized data in the first storage area 16 or the second storage area 17 is mapped to the address of the first unit sized data.

At step S43, if the actual data location for the first unit sized data corresponding to the address desired to be read at least partially corresponds to the first storage area 16, the mass storage device 10 generates decompressed data by decompressing compressed second unit sized data fetched from the actual data location in the first storage area 16.

At step S44, if the actual data location of the first unit sized data of the address desired to be read at least partially corresponds to the second storage area 17, the mass storage device 10 fetches uncompressed second unit sized data from the actual data location in the second storage area 17.

At step S45, the mass storage device 10 generates first unit sized data from the decompressed data or the uncompressed second unit sized data, and transmits the generated first unit sized data to the host device.

Figure 5:
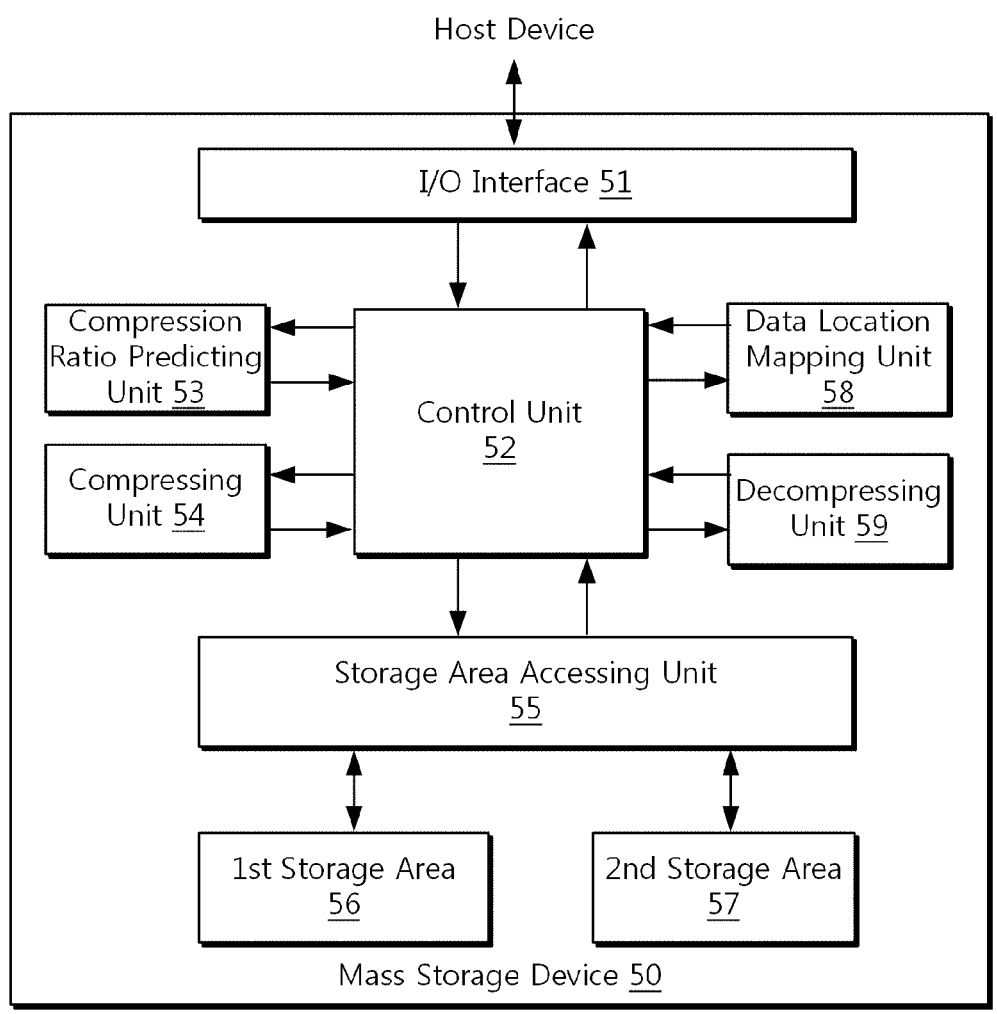
FIG. 5 is a conceptual diagram illustrating a mass storage system for storing data in a distributed manner based on a technique of predicting a data compression ratio according to another embodiment of the present invention.

FIG. 5 is a conceptual diagram illustrating a mass storage system 50 for storing data in a distributed manner based on a technique of predicting a data compression ratio according to another embodiment of the present invention.

Referring to FIG. 5, the mass storage system 50 for storing data in a distributed manner based on a technique of predicting a data compression ratio may include an input and output interface 51, a control unit 52, a compression ratio predicting unit 53, a compressing unit 54, a storage device accessing unit 55, a plurality of storage devices 56 and 57, a data location mapping unit 58, and a decompressing unit 59.

Since the operation of the mass storage system 50 for storing data illustrated in FIG. 5 is substantially the same as the mass storage device 10 of FIG. 1, a detailed description thereof is omitted.

In the mass storage device 10 of FIG. 1, the plurality of storage areas 16 and 17 are not of individual storage devices. In contrast, in the mass storage system 50 of FIG. 5, the plurality of storage devices 56 and 57 are detachable individual storage devices.

For example, the first storage device 56 may be an expensive, high-speed Solid State Drive (SSD), and the second storage device 57 may be a relatively inexpensive hard disk drive (HDD) device.

Furthermore, for example, the first storage device 56 may be an expensive, high-speed server-oriented HDD device, and the second storage device 57 may be a relatively inexpensive, personal HDD device.

The present invention] may be implemented as a program that can be executed by various computer means. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Furthermore, the computer-readable medium is distributed across computer systems connected over a network, so that computer-readable code is stored and executed.

The method of storing data in a distributed manner based on a technique of predicting a data compression ratio and the mass storage device and system using the method according to some embodiments of the present invention have the advantage of predicting the compression ratio of storing unit data, such as a sector or a cluster, called a chunk, rather than analyzing the file extension or attribute of data, and determining whether to compress storing unit data based on the predicted data compression ratio.

The method of storing data in a distributed manner based on a technique of predicting a data compression ratio and the mass storage device and system using the method according to some embodiments of the present invention have the advantage of compressing and storing data if it is determined based on the predicted data compression ratio that it is desirable to compress storing unit data, and storing data without compressing if not.

The method of storing data in a distributed manner based on a technique of predicting a data compression ratio and the mass storage device and system using the method according to some embodiments of the present invention have the advantage of selecting the most preferable component from among a plurality of low-level storage components based on predicted data compression ratio and then storing unit data in a distributed manner.

The advantages of the present invention are not limited to the above-described ones, and other advantages can be readily understood by those skilled in the art from the above detailed description.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of distributively storing data in a mass storage device having logically or physically defined first and second storage areas, based on data compression ratio prediction, the method comprising:
receiving an address and a first unit sized data, together with a write command, from a host device;
estimating a predicted compression ratio of the first unit sized data, based on a Shannon byte entropy;
calculating a benefit of compression, based on the predicted compression ratio;
comparing the calculated benefit of compression with a predetermined benefit threshold value, and
in response to the calculated benefit of compression being higher than the predetermined benefit threshold value, compressing the first unit sized data so as to store the compressed data in the first storage area, and
in response to the calculated benefit of compression being equal to or lower than the predetermined benefit threshold value, storing the first unit sized data in the second storage area;
wherein the predicted compression ratio is estimated using the following predicted compression ratio estimation formula:

$$C(X)=H(X)^c;$$

wherein C(X) is a predicted compression ratio of sample data X,
c is a predicted compression index that is empirically given, based on a compression method, and
H(X) is the Shannon byte entropy of the sample data X, estimated using the following formula:

$$H(X) = -\sum_i P(x_i)\log_b P(x_i)$$
$$= -\sum_i \frac{n_i}{N}\log_b \frac{n_i}{N};$$
$$= \log_b N - \frac{1}{N}\sum_i n_i \log_b n_i$$

wherein sample data X includes a data symbol $x_i$,
$n_i$ is the frequency of appearance of each data symbol $x_i$ in the sample data X,
N is an overall frequency of appearance of all of the data symbols in the sample data X, and
$P(x_i)$ is the probability mass function of the data symbol $x_i$.

2. A method of distributively storing data in a mass storage device having logically or physically defined first and second storage areas, based on data compression ratio prediction, the method comprising:
receiving an address and a first unit sized data, together with a write command, from a host device;
estimating a predicted compression ratio of the first unit sized data, based on a Shannon byte entropy;
calculating a benefit of compression, based on the predicted compression ratio;
comparing the calculated benefit of compression with a predetermined benefit threshold value, and
in response to the calculated benefit of compression being higher than the predetermined benefit threshold value, compressing the first unit sized data so as to store the compressed data in the first storage area, and
in response to the calculated benefit of compression being equal to or lower than the predetermined benefit threshold value, storing the first unit sized data in the second storage area;
wherein the predicted compression ratio is estimated using the following predicted compression ratio estimation formula:

$$C(X)=2^{H(x)^2}-1,$$

wherein C(X) is the predicted compression ratio of sample data X, and H(X) is the Shannon byte entropy of the sample data X.

3. The method of claim 1, wherein the predicted compression ratio is estimated by referring to a look-up table that is constructed by mapping values of Shannon entropy to values of the predicted compression ratio based on actual compression ratio obtained using the compression method.

4. The method of claim 1, wherein the benefit of compression is calculated, based on at least one of:
a remaining storage capacity of the first storage area, which is configured to store: compressed data, and
a remaining storage capacity of the second storage area, which is configured to store: uncompressed data, data fragmentation degree, compression-related overhead, an issuer of a write command and a size of a file, and the predicted compression ratio.

5. The method of claim 1, wherein compressing the first unit sized data, and then storing the compressed data in the first storage area comprises:
converting the compressed data into at least one piece of second unit sized data having a second unit size for storing data in the first storage area; and
storing the second unit sized data in the first storage area;
wherein storing the first unit sized data in the second storage area comprises:
converting the first unit sized data into at least one piece of second unit sized data; and
storing the second unit sized data in the second storage area.

6. The method of claim 5, further comprising:
mapping actual data locations of the second unit sized data in the first and second storage areas to the address of the first unit sized data; and
recording the actual data locations and the address together in a data location mapping unit.

7. The method of claim 6, further comprising:
receiving an address of first unit sized data desired to be accessed, together with a read command, from the host device;
obtaining the actual data location corresponding to the address attached to the read command, by referring to the data location mapping unit, and
in response to the actual data location of the first unit sized data desired to be read corresponding to the first storage area, fetching compressed second unit sized data from the actual data location in the first storage area so as to generate the decompressed data, by decompressing the compressed second unit sized data; and
in response to the actual data location of the first unit sized data desired to be read corresponding to the second storage area, fetching uncompressed second unit sized data from the actual data location in the second storage area; and
generating the first unit sized data from the decompressed data or the uncompressed second unit sized data, so as to transmit the generated first unit sized data to the host device.

8. A device for distributively storing data based on data compression ratio prediction, the device capable of defining logically or physically first and second storage areas, the device comprising:
a compression ratio predicting unit configured to, in response to receiving an address and a first unit sized data, together with a write command, from a host device, estimate a predicted compression ratio of the first unit sized data, based on a Shannon byte entropy;
a compressing unit configured to generate compressed data, by compressing the first unit sized data; and
a control unit configured
to calculate benefit of compression, based on at least the estimated predicted compression ratio,
to compare the calculated benefit of compression with a predetermined benefit threshold value, and
to store the data compressed by the compressing unit in the first storage area, in response to the calculated benefit of compression being higher than the predetermined benefit threshold value, and
to store the first unit sized data in the second storage area, in response to the calculated benefit of compression being equal to or lower than the predetermined benefit threshold value;
wherein the predicted compression ratio is estimated using the following predicted compression ratio estimation formula:

$$C(X) = H(X)^c;$$

wherein C(X) is a predicted compression ratio of sample data X,
c is a predicted compression index that is empirically given, based on a compression method, and
H(X) is the Shannon byte entropy of the sample data X, estimated using the following formula:

$$H(X) = -\sum_i P(x_i) \log_b P(x_i)$$

$$= -\sum_i \frac{n_i}{N} \log_b \frac{n_i}{N};$$

$$= \log_b N - \frac{1}{N} \sum_i n_i \log_b n_i$$

wherein sample data X includes a data symbol $x_i$,
$n_i$ is the frequency of appearance of each data symbol $x_i$ in the sample data X,
N is an overall frequency of appearance of all of the data symbols in the sample data X, and
$P(x_i)$ is the probability mass function of the data symbol $x_i$.

9. A device for distributively storing data, based on data compression ratio prediction, the device capable of defining logically or physically first and second storage areas, the device comprising:
a compression ratio predicting unit configured to, in response to receiving an address and a first unit sized data, together with a write command, from a host device, estimate a predicted compression ratio of the first unit sized data, based on a Shannon byte entropy;
a compressing unit configured to generate compressed data, by compressing the first unit sized data; and
a control unit configured
to calculate benefit of compression, based on at least the estimated predicted compression ratio,
to compare the calculated benefit of compression with a predetermined benefit threshold value, and
to store the data compressed by the compressing unit in the first storage area, in response to the calculated benefit of compression being higher than the predetermined benefit threshold value, and
to store the first unit sized data in the second storage area, in response to the calculated benefit of compression being equal to or lower than the predetermined benefit threshold value;
wherein the predicted compression ratio is estimated using the following predicted compression ratio estimation formula:

$$C(X) = 2^{H(x)^2} - 1; \text{ and}$$

wherein C(X) is the predicted compression ratio of sample data X, and H(X) is the Shannon byte entropy of the sample data X.

10. The device of claim 8, wherein the predicted compression ratio is estimated by referring to a look-up table that is constructed by mapping values of Shannon entropy to values of predicted compression ratio based on actual compression ratio obtained using the compression method.

11. The device of claim 8, wherein the benefit of compression is calculated, based on at least one of:
a remaining storage capacity of the first storage area, which is configured to store: compressed data, and
a remaining storage capacity of the second storage area, which is configured to store: uncompressed data, data fragmentation degree, compression-related overhead, an issuer of a write command and a size of a file, and the predicted compression ratio.

12. The device of claim 8, wherein the control unit is further configured to:
calculate the benefit of compression, based on at least the estimated predicted compression ratio, and compare the calculated benefit of compression with a predetermined benefit threshold value, and
in response to the calculated benefit of compression being higher than the predetermined benefit threshold value, convert compressed data into at least one piece of second unit sized data having a second unit size for storing data in the first storage area, so as to store the second unit sized data in the first storage area, and in response to the calculated benefit of compression being equal to or lower than the predetermined benefit threshold value, convert the first unit sized data into at least one piece of second unit sized data, so as to store the second unit sized data in the second storage area.

13. The device of claim 12, further comprising
a data location mapping unit configured to map actual data locations of the second unit sized data in the first and second storage areas, to the address of the first unit sized data, so as to record the actual data locations and the address together.

14. The device of claim 13, further comprising:
a decompressing unit configured to generate decompressed data, by decompressing the compressed second unit sized data;

wherein the control unit is further configured to, in response to receiving an address of first unit sized data desired to be accessed, together with a read command, from the host device:

obtain the actual data location corresponding to the address attached to the read command, by referring to the data location mapping unit, and in response to the actual data location of the first unit sized data desired to be read corresponding to the first storage area, fetch compressed second unit sized data from the actual data location in the first storage area and generate the decompressed data, by decompressing the compressed second unit sized data, and in response to the actual data location of the first unit sized data desired to be read corresponding to the second storage area, fetch uncompressed second unit sized data from the actual data location in the second storage area, and generate the first unit sized data from the decompressed data or the uncompressed second unit sized data, so as to transmit the generated first unit sized data to the host device.

15. A system, capable of mounting first and second storage devices defined logically or physically for functioning as independent storage devices, the system comprising:

a compression ratio predicting unit configured to, in response to receiving an address and a first unit sized data, together with a write command, from a host device, estimate a predicted compression ratio of the first unit sized data based on a Shannon byte entropy;

a compressing unit configured to generate compressed data by compressing the first unit sized data; and a control unit configured
to calculate benefit of compression, based on at least the estimated predicted compression ratio,
to compare the calculated benefit of compression with a predetermined benefit threshold value, and
to store the data compressed by the compressing unit in the first storage area, in response to the calculated benefit of compression being higher than the predetermined benefit threshold value, and
to store the first unit sized data in the second storage area, in response to the calculated benefit of compression being equal to or lower than the predetermined benefit threshold value;

wherein the predicted compression ratio is estimated using the following predicted compression ratio estimation formula:

$C(X)=H(X)^c$;

wherein $C(X)$ is a predicted compression ratio of sample data X,
c is a predicted compression index that is empirically given, based on a compression method, and
$H(X)$ is the Shannon byte entropy of the sample data X, estimated using the following formula:

$$H(X) = -\sum_i P(x_i)\log_b P(x_i)$$
$$= -\sum_i \frac{n_i}{N}\log_b \frac{n_i}{N};$$
$$= \log_b N - \frac{1}{N}\sum_i n_i \log_b n_i$$

wherein sample data X includes a data symbol $x_i$,
$n_i$ is the frequency of appearance of each data symbol $x_i$ in the sample data X,
N is an overall frequency of appearance of all of the data symbols in the sample data X, and
$P(x_i)$ is the probability mass function of the data symbol $x_i$.

16. The system of claim 15, wherein the control unit is further configured to:
calculate the benefit of compression, based on at least the estimated predicted compression ratio, and compare the calculated benefit of compression with a predetermined benefit threshold value, and in response to the calculated benefit of compression being higher than the predetermined benefit threshold value, convert the compressed data, which is compressed by the compressing unit, into at least one piece of second unit sized data having a second unit size for storing data in the first storage area, and store the second unit sized data in the first storage area, and in response to the calculated benefit of compression being equal to or lower than the predetermined benefit threshold value, convert the first unit sized data into at least one piece of second unit sized data, and store the second unit sized data in the second storage area.

17. The system of claim 16, further comprising:
a data location mapping unit configured to map actual data locations of the second unit sized data in the first and second storage areas, to the address of the first unit sized data, and then to record the actual data locations and the address together.

18. The system of claim 17, further comprising
a decompressing unit configured to generate decompressed data, by decompressing the compressed second unit sized data;

wherein the control unit is further configured to, in response to receiving an address of first unit sized data desired to be accessed, together with a read command, from the host device:

obtain the actual data location corresponding to the address attached to the read command, by referring to the data location mapping unit, and in response to the actual data location of the first unit sized data desired to be read corresponding to the first storage area, fetch compressed second unit sized data from the actual data location in the first storage area and generate the decompressed data, by decompressing the compressed second unit sized data, and in response to the actual data location of the first unit sized data desired to be read corresponding to the second storage area, fetch uncompressed second unit sized data from the actual data location in the second storage area; and generate the first unit sized data from the decompressed data or the uncompressed second unit sized data, and transmit the generated first unit sized data to the host device.

\* \* \* \* \*